| (12) | United States Patent | (10) Patent No.: | US 9,245,121 B1 |
|---|---|---|---|
| | Luo et al. | (45) Date of Patent: | Jan. 26, 2016 |

(54) DETECTING SUSPICIOUS NETWORK BEHAVIORS BASED ON DOMAIN NAME SERVICE FAILURES

(71) Applicant: Narus, Inc., Sunnyvale, CA (US)

(72) Inventors: Pengkui Luo, Minneapolis, MN (US); Ruben Torres, Sunnyvale, CA (US); Zhi-Li Zhang, Eden Prairie, MN (US); Sabyasachi Saha, Sunnyvale, CA (US); Sung-Ju Lee, Redwood City, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 137 days.

(21) Appl. No.: 13/963,881

(22) Filed: Aug. 9, 2013

(51) Int. Cl.
*H04L 29/06* (2006.01)
*G06F 21/56* (2013.01)

(52) U.S. Cl.
CPC ............... *G06F 21/56* (2013.01); *H04L 63/14* (2013.01)

(58) Field of Classification Search
CPC ...................................................... H04L 63/14
USPC .......................................................... 726/23
See application file for complete search history.

(56) References Cited

U.S. PATENT DOCUMENTS 8,516,585 B2 * 8/2013 Cao et al. ...................... 726/23

OTHER PUBLICATIONS

Antonakakis, M., et al., "From Throw-Away Traffic to Bots: Detecting the Rise of DGA-Based Malware," in USENIX Security, Aug. 10, 2012.
Bilge, L., et al., "Exposure: Finding Malicious Domains Using Passive DNS Analysis," in NDSS, Feb. 8, 2011.
Gao, Y., et al., "An Empirical Reexamination of Global DNS Behavior," in ACM SIGCOMM, Aug. 15, 2013.

* cited by examiner

*Primary Examiner* — Longbit Chai
(74) *Attorney, Agent, or Firm* — Kwan & Olynick LLP

(57) ABSTRACT

A method for detecting a malicious node in a network. The method includes obtaining a plurality of failed domain name service (DNS) queries from the network, wherein each of the plurality of failed DNS queries is initiated from a client node of the network and comprises an effective second-level domain (eSLD) name, generating, by a computer processor and using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm, determining, by the computer processor and using a pre-determined formula, a score representing statistical characteristics of the cluster, and assigning, in response to the score meeting a pre-determined criterion, a malicious status to the client node.

24 Claims, 5 Drawing Sheets

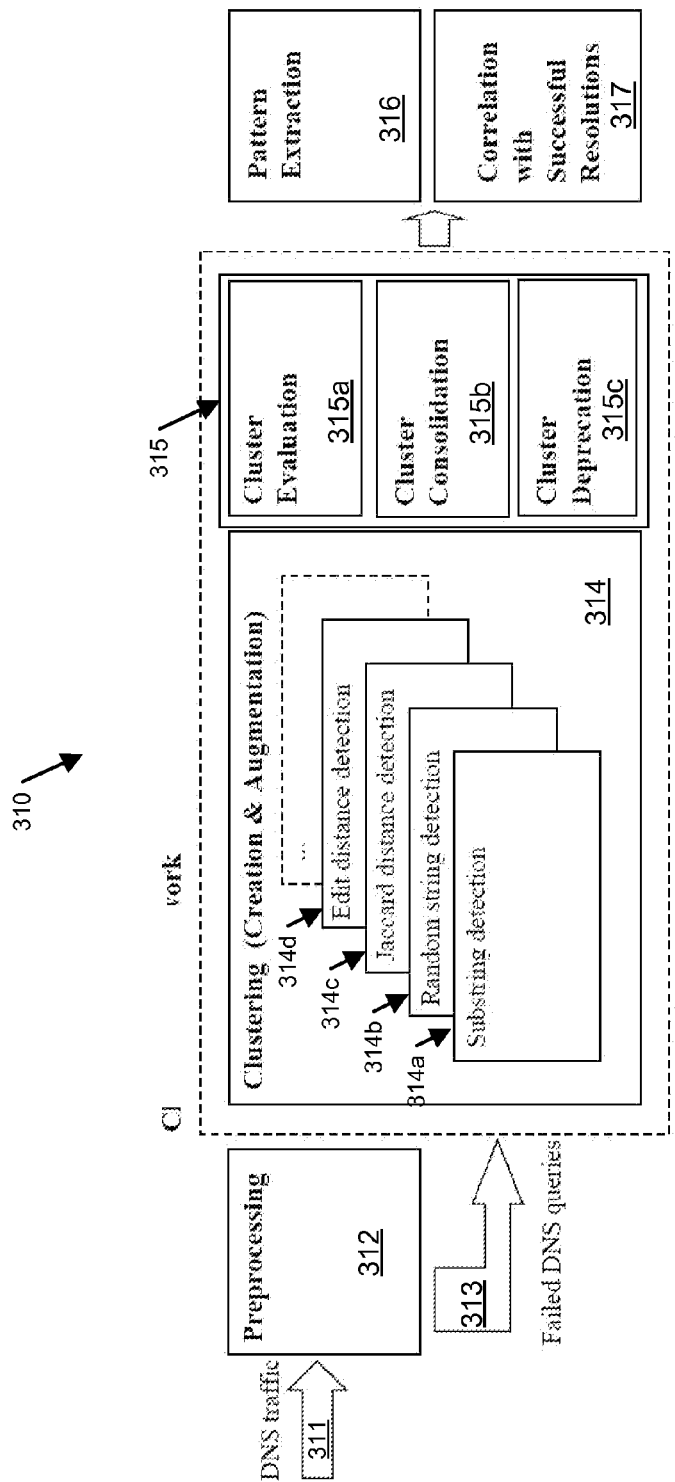
FIG. 3.1

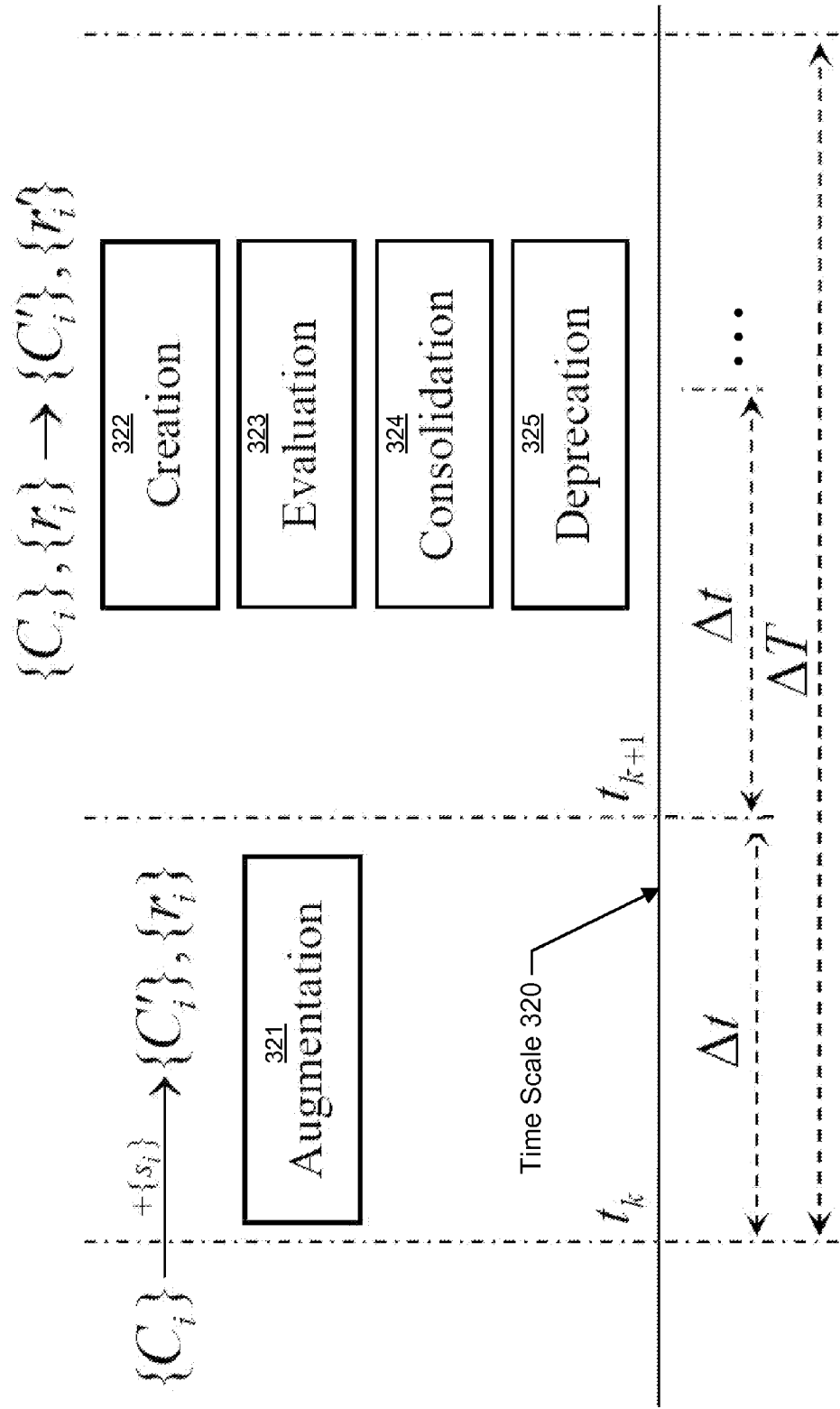
FIG. 3.2

DETECTING SUSPICIOUS NETWORK BEHAVIORS BASED ON DOMAIN NAME SERVICE FAILURES

BACKGROUND OF THE INVENTION

A botnet is a collection of internet-connected programs communicating with other similar programs in order to perform tasks, which may be a malicious task such as sending spam emails or participating in DDoS attacks. Malicious botnets compromise computers whose security defenses have been breached and control ceded to a third party (referred to as a botmaster). Each such compromised device, known as a "bot", is created when a computer is penetrated by software from a malware (malicious software) distribution. Each bot periodically contacts the controller (referred to as command and control or C&C) of the botnet to receive instructions for carrying out the malicious tasks.

The Domain Name System (DNS) provides an essential naming service that translates human-readable domain names to numerical IP addresses, and vice versa. As a crucial component of the Internet and one of the world's largest distributed systems, DNS has been increasingly abused by adversaries to hide the location of malware servers. In particular, botnets have persistently abused the DNS infrastructure to add resiliency to their command and control (C&C) communication. For instance, in domain-flux techniques, instead of associating a C&C to a single domain name (i.e., a single point of failure), the botmaster registers several domain names and the bots try to resolve the correct ones from these registered multiple domain names using a Domain Generation Algorithm (DGA). An effective top-level domain (eTLD), also known as a public suffix, is the highest level at which a domain may be directly registered for a particular top-level domain. For example, .com, .cn and .co.uk are eTLDs, in which domains (e.g., foo.com, blah.cn and bar.co.uk, respectively) can be directly registered. These directly registered domains (i.e., foo, blah, and bar) are referred to as an effective second-level domain (eSLD) names.

Attempts to detect domain-flux botnets often require disassembling malware binaries for the DGAs, which requires labor-intensive effort and only provides a point solution.

SUMMARY

In general, in one aspect, the present invention relates to a method for detecting a malicious node in a network. The method includes obtaining a plurality of failed domain name service (DNS) queries from the network, wherein each of the plurality of failed DNS queries is initiated from a client node of the network and comprises an effective second-level domain (eSLD) name, generating, by a computer processor and using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm, determining, by the computer processor and using a pre-determined formula, a score representing statistical characteristics of the cluster, and assigning, in response to the score meeting a pre-determined criterion, a malicious status to the client node.

In general, in one aspect, the present invention relates to a system for detecting a malicious node in a network. The system includes a (a) processor, (b) memory storing instructions executable by the processor, wherein the instructions include (i) a cluster generation module configured to obtain a plurality of failed domain name service (DNS) queries from the network, wherein each of the plurality of failed DNS queries is initiated from a client node of the network and comprises an effective second-level domain (eSLD) name, and generate, using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm, (ii) a cluster evaluation module configured to determine, using a pre-determined formula, a score representing statistical characteristics of the cluster, and (iii) a malicious status assigning module configured to assign, in response to the score meeting a pre-determined criterion, a malicious status to the client node, and (c) a repository configured to store the plurality of eSLD names and the cluster.

In general, in one aspect, the present invention relates to a computer readable medium storing instructions detecting a malicious node in a network, the instructions when executed by a processor comprising functionality for obtaining a plurality of failed domain name service (DNS) queries from the network, wherein each of the plurality of failed DNS queries is initiated from a client node of the network and comprises an effective second-level domain (eSLD) name, generating, using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm, determining, using a pre-determined formula, a score representing statistical characteristics of the cluster, and assigning, in response to the score meeting a pre-determined criterion, a malicious status to the client node.

Other aspects of the invention will be apparent from the following description and the appended claims.

BRIEF DESCRIPTION OF DRAWINGS

FIGS. 3.1-3.2 show an example according to aspects of the invention.

DETAILED DESCRIPTION

Figure 1:
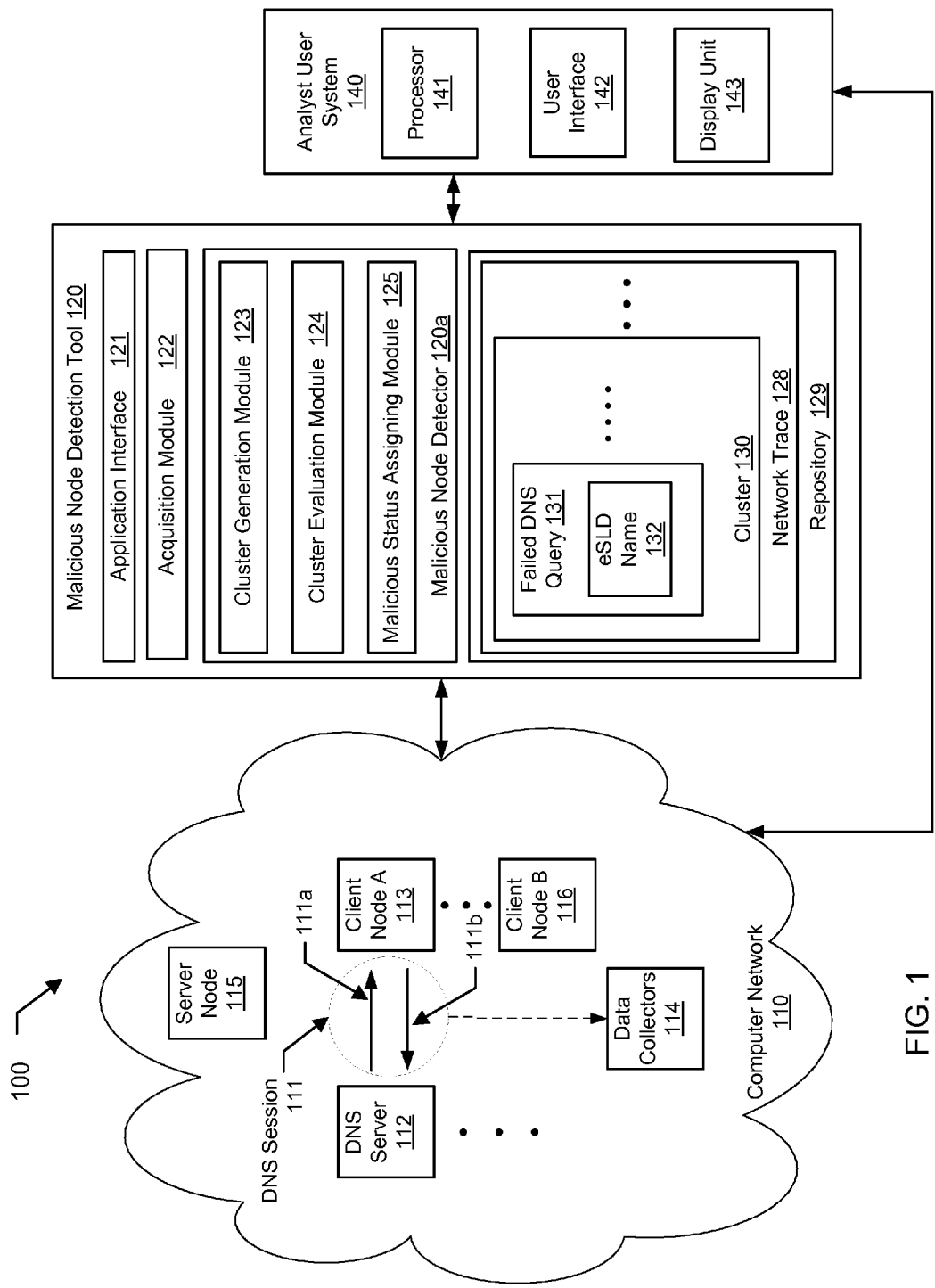
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method and system for determining a node in a network to be malicious by analyzing failed DNS queries initiated by the node. In one or more embodiments, the malicious node is a bot and the failed DNS queries correspond to the bot's attempt to contact the C&C using a DGA. In one or more embodiments, the bot uses the DGA to resolve a correct domain name of the C&C from multiple domain names registered by the botmaster. The DGA causes the bot to generate DNS queries, typically referencing a large number of domains. Many of these DNS queries would be failed DNS queries causing the DNS server to return DNS responses containing error codes. A few successful DNS queries would result in DNS responses containing the IP address of the C&C. In one or more embodiments, a cluster is identified from the failed DNS queries and statistical characteristics of the cluster are analyzed to determine whether the node is malicious or not.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a malicious node detection tool (120), a user system (140), and a computer network (110). The malicious node detection tool (120) includes a data repository (129), an application interface (121), an acquisition module (122), and a malicious node detector (120a), which further includes one or more of a cluster generation module (123), a cluster evaluation module (124), and a malicious status assigning module (125). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (115), client node A (113), client node B (116), DNS server (112), data collectors (114), etc.), which are devices configured with computing and communication capabilities for executing applications in the computer network (110). In particular, the DNS server (112) and the data collectors (114) are special type of nodes executing DNS application and data collection application, respectively.

As shown in FIG. 1, the DNS server (112) and client node A (113) communicate with each other by exchanging data packets forming a DNS session (111), which includes a DNS query (111a) and a DNS response (111b) represented by two arrows. In one or more embodiments, the DNS server (112) and the client node A (113) exchange data packets in the DNS session (111) as a result of an attempt of the client node A (113) to access the server node (115) using a human readable domain name included in the DNS query (111a). If the DNS query (111a) is successful, the DNS response (111b) will include the IP address of the server node (115) that the client node A (113) may use to communicate with the server node (115). For example, the client node A (113) may be a bot and the server node (115) may be the C&C contacted by the bot to receive instructions periodically.

In one or more embodiments, certain device(s) (e.g., data collectors (114)) within the computer network (110) may be configured to collect network data (e.g., DNS session (111), among other traffic flows) for providing to the malicious node detection tool (120). Each of these components is described below. One of ordinary skill in the art will appreciate that embodiments are not limited to the configuration shown in FIG. 1.

In one or more embodiments of the invention, the malicious node detection tool (120) is configured to interact with the computer network (110) using one or more of the application interface (121). The application interface (121) may be configured to receive data (e.g., DNS session (111)) from the computer network (110) and/or store received data to the data repository (129). Such network data captured over a time period (e.g., an hour, a day, a week, etc.) is referred to as trace or network trace (e.g., network trace (128)). Network trace contains network traffic data related to communications between nodes in the computer network (110). For example, the network trace (128) may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide the network trace (128) to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious node detection tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the malicious node detection tool (120). The analyst user may include, but is not limited to, an individual, a group, an organization, or some other entity having authority and/or responsibility to access the malicious node detection tool (120). Specifically, the context of the term "analyst user" here is distinct from that of a user of the computer network (110). The user system (140) may be, or may contain a form of, an internet-based communication device that is capable of communicating with the application interface (121) of the malicious node detection tool (120). Alternatively, the malicious node detection tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious node detection tool (120) (e.g., report, alert, etc.).

As shown, communication links are provided between the malicious node detection tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious node detection tool (120), the user system (140), and the communication links may be part of the computer network (110).

In one or more embodiments, a central processing unit (CPU, not shown) of the malicious node detection tool (120) is configured to execute instructions to operate the components of the malicious node detection tool (120). In one or more embodiments, the memory (not shown) of the malicious node detection tool (120) is configured to store software instructions for analyzing the network trace (128) to extract features (e.g., cluster (130), failed DNS query (131), eSLD name (132), etc.) for detecting malicious node(s) in the computer network (110). The memory may be one of a variety of memory devices, including but not limited to random access memory (RAM), read-only memory (ROM), cache memory, and flash memory. The memory may be further configured to serve as back-up storage for information stored in the data repository (129).

The malicious node detection tool (120) may include one or more system computers, which may be implemented as a server or any conventional computing system having a hardware processor. However, those skilled in the art will appreciate that implementations of various technologies described herein may be practiced in many different computer system configurations, including one or more of multiprocessor systems, hand-held devices, networked personal computers, minicomputers, mainframe computers, and the like.

In one or more embodiments, the malicious node detection tool (120) is configured to obtain and store data in the data repository (129). In one or more embodiments, the data repository (129) is a persistent storage device (or set of devices) and is configured to receive data from the computer network (110) using the application interface (121). The data repository (129) is also configured to deliver working data to, and receive working data from, the acquisition module (122), cluster generation module (123), cluster evaluation module (124), and malicious status assigning module (125). As shown in FIG. 1, the data repository (129) stores multiple clusters, such as the cluster (130) that includes multiple failed DNS queries (e.g., failed DNS query (131) containing an eSLD name (132)). The data repository (129) may be a data store (e.g., a database, a file system, one or more data structures configured in a memory, some other medium for storing data, or any suitable combination thereof), which may include information related to the malicious node detection. The data repository (129) may be a device internal to the malicious node detection tool (120). Alternatively, the data repository (129) may be an external storage device operatively connected to the malicious node detection tool (120).

In one or more embodiments, the malicious node detection tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious node detection tool (120) is configured to support various data formats provided by the user system (140).

In one or more embodiments, the malicious node detection tool (120) includes the acquisition module (122) that is configured to obtain the network trace (128) from the computer network (110), for example via data collectors (114). In one or more embodiments, the acquisition module (122) works in conjunction with the data collectors (114) to match the DNS query (111a) and the DNS response (111b) that form the DNS session (111). For example, the DNS session (111), or information extracted therefrom, may then be stored in the repository (127) as part of the cluster (130), etc.

In one or more embodiments, the malicious node detection tool (120) includes the cluster generation module (123) that is configured to obtain a collection of failed domain name service (DNS) queries (e.g., failed DNS query (131)), where each failed DNS query in the collection is initiated from a single client node (e.g., client node A (113)) and include an eSLD name (e.g., eSLD name (132)). By analyzing the collection of failed DNS queries initiated from the client node A (113), the cluster generation module (123) generates the cluster (131) from all eSLD names contained in the collection of failed DNS queries. In particular, the cluster (130) includes a portion of all eSLD names found in the collection of failed DNS queries. In one or more embodiments, the portion is selected using a pre-determined clustering algorithm, for example, based on a randomness measure, a Jaccard distance, an edit distance, or a substring test associated with the eSLD names. Additional details of these example clustering algorithms are described in reference to FIG. 3.1 below.

In one or more embodiments, the malicious node detection tool (120) includes the cluster evaluation module (124) that is configured to determine, using a pre-determined formula, a score representing statistical characteristics of the cluster (130). In one or more embodiments, the pre-determined formula uses one or more of a cohesiveness measure, a size measure, a repetitiveness measure, and an inter-arrival time measure of the cluster (130) to calculate the score. Specifically, the cohesiveness measure represents similarity among the portion of the eSLD names included in the cluster (130), the size measure represents a tally of the eSLD names included in the cluster (130), the repetitiveness measure represents a number of similar subsets of the cluster (130) repetitively occurring at different time epochs, and the inter-arrival time measure represents an average inter-arrival time of the eSLD names included in the cluster (130). Additional details of these example statistical measures are described in reference to FIGS. 3.1-3.2 below.

In one or more embodiments, the malicious node detection tool (120) includes the malicious status assigning module (125) that is configured to assign, in response to the score meeting a pre-determined criterion, a malicious status to the client node A (113). For example, the score may be proportional to one or more of the cohesiveness measure, the size measure, and the repetitiveness measure, and/or inversely proportional to the inter-arrival time measure. Accordingly, the client node A (113) is assigned the malicious status if the score exceeds a pre-determined threshold. In one or more embodiments, the malicious status assigning module (125) is further configured to assign the malicious status to the server node (115) and/or the client node B (116) based on pre-determined criterion. Additional details of assigning the malicious status to the client node A (113), the client node B (116), and/or the server node (115) are described in reference to FIGS. 2 and 3.1-3.2 below.

Figure 2:
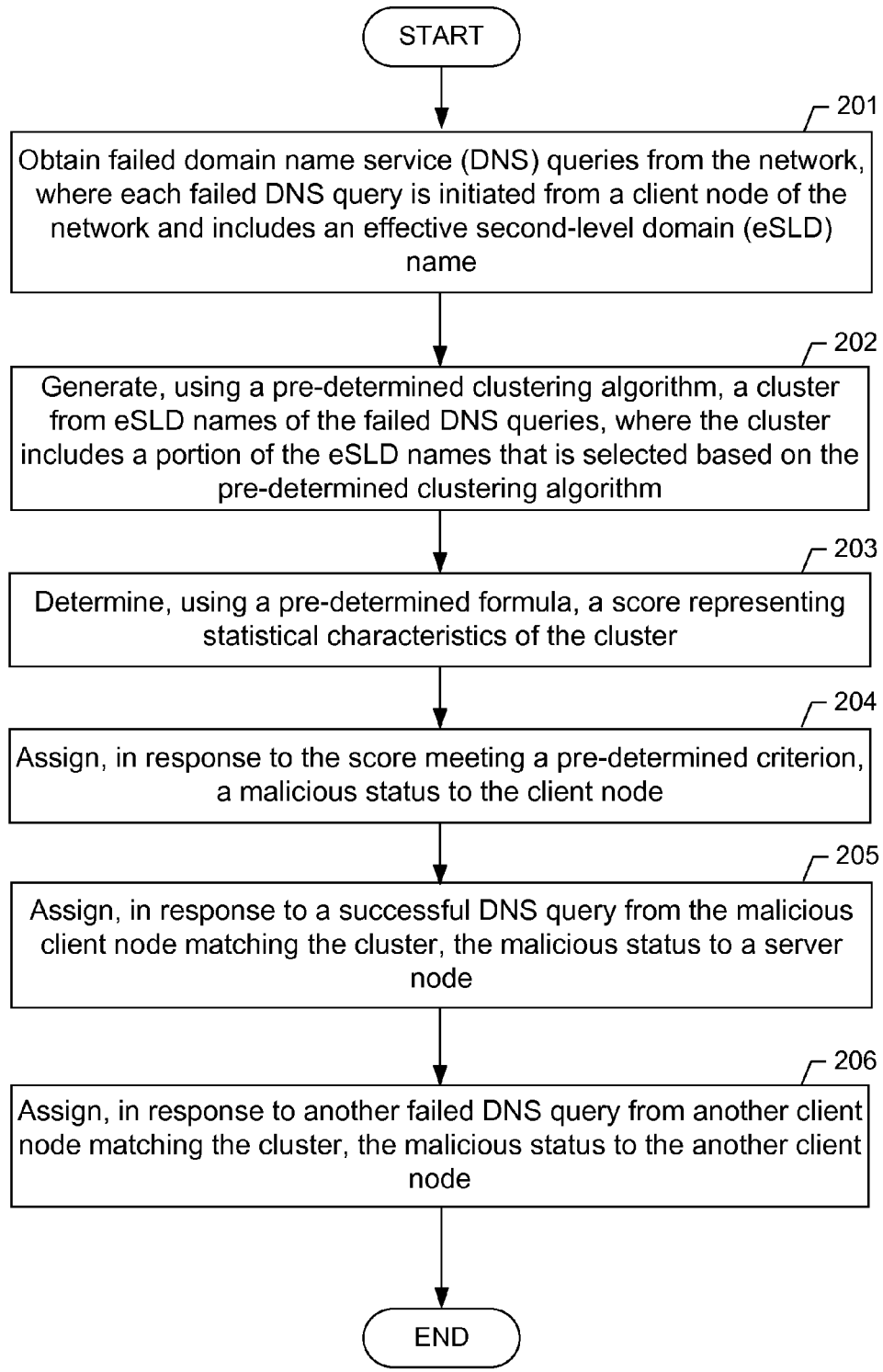
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, a collection of failed domain name service (DNS) queries is obtained from a computer network. In one or more embodiments, each failed DNS query in the collection is initiated from a client node of the computer network and includes an effective second-level domain (eSLD) name.

In Step 202, using a pre-determined clustering algorithm, a cluster is generated from all eSLD names found in the collection of failed DNS queries. In one or more embodiments, the cluster includes a portion of these eSLD names that is selected based on the pre-determined clustering algorithm. In one or more embodiments, the pre-determined clustering algorithm is based on one or more of a randomness measure, a Jaccard distance, an edit distance, and a substring test associated with these eSLD names. Additional details of these example clustering algorithms are described in reference to FIGS. 3.1-3.2 below.

In Step 203, using a pre-determined formula, a score is determined for representing statistical characteristics of the cluster. In one or more embodiments, determining the score includes (i) calculating a cohesiveness measure of the cluster to represent similarity among the eSLD names included in the cluster, and (ii) using the cohesiveness measure as an input of the pre-determined formula to determine the score. In one or more embodiments, determining the score includes (i) calculating a size measure of the cluster to represent a tally of the eSLD name included in the cluster, and (ii) using the size measure as an input of the pre-determined formula to determine the score. In one or more embodiments, determining the score includes (i) calculating a repetitiveness measure of the cluster to represent a number of similar subsets of the cluster repetitively occurring at different time epochs, (ii) using the repetitiveness measure as an input of the pre-determined formula to determine the score. In one or more embodiments, determining the score includes (i) calculating an inter-arrival time measure of the cluster to represent an average inter-arrival time of the eSLD name included in the cluster, and (ii) using the inter-arrival time measure as an input of the pre-determined formula to determine the score. In one or more embodiments, the pre-determined formula uses a combination of the cohesiveness measure, the size measure, the repetitiveness measure, and the inter-arrival time measure of the cluster to calculate the score. Additional details of these example statistical measures are described in reference to FIGS. 3.1-3.2 below.

In Step 204, in response to the score meeting a pre-determined criterion, a malicious status is assigned to the cluster. For example, the score may be proportional to one or more of the cohesiveness measure, the size measure, and the repetitiveness measure, and/or inversely proportional to the inter-arrival time measure. Accordingly, the client node is assigned the malicious status if the score exceeds a pre-determined threshold. In one or more embodiments, the client node is also assigned the malicious status indicating that at least one malicious cluster is generated by the client node, In Step 205, in response to a successful DNS query from the malicious client node matching the cluster, the malicious status is assigned to a server node. In one or more embodiments, the successful DNS query is obtained from the network and includes another eSLD name. The another eSLD name is then compared to the cluster to determine a match, which leads to assigning the malicious status to a server node identified based on a server IP address returned by the successful DNS query. Additional details of assigning the malicious status to the server node are described in reference to FIGS. 3.1-3.2 below.

In Step 206, in response to another failed DNS query from another client node matching the cluster, the malicious status is assigned to the another client node. In one or more embodiments, an eSLD name pattern is extracted from the eSLD names included in the cluster. This eSLD name pattern is then used for matching any eSLD name contained in other failed DNS query. Any such match leads to assigning the malicious status to the client node initiating the corresponding failed DNS query. Additional details of assigning the malicious status to the another client node are described in reference to FIGS. 3.1-3.2 below.

In one or more embodiments, in response to assigning the malicious status to any client node or server node, a pre-determined security measure is initiated to mitigate the malicious activities. For example, network traffic may be selectively blocked from the malicious client/server nodes. In another example, honeypots are set up to trap botnet traffic toward the malicious client/server nodes.

FIG. 3.1 depicts system components of an example suspicious client detecting framework (310). In particular, the example suspicious client detecting framework (310) may be based on the malicious node detection tool (120) and/or the method flowchart described in reference to FIG. 1 and FIG. 2, respectively above. As shown in FIG. 3.1, the failed DNS queries (311) from a client machine are processed by the preprocessing module (312) to filter out known benign failures and extract the eSLDs from the remainders. These remaining failed eSLDs (313) are then sent into the clustering module (314) to form clusters, each exhibiting a unique pattern. Decisions are made by the clustering module (314) on whether some of these failed eSLDs (313) should form standalone clusters or be added to existing clusters. Various cluster detection algorithms (i.e., (314a), (314b), (314c), (314d), etc.) are run in parallel to capture clusters exhibiting different patterns. In order to ensure the "quality" of clusters, all clusters are periodically evaluated by the evaluation module (315a) where frequently repeating patterns are rewarded. Small clusters are consolidated into bigger clusters with better "quality" by the cluster consolidation module (315b). Clusters with poor quality are deleted by the deprecation module (315c). The evaluation module (315a), cluster consolidation module (315b), and deprecation module (315c) collectively form the evolutionary learning module (315). Any client associated with at least one good quality DNS failure cluster is assigned a suspicious status. After clustering all failed eSLDs of the suspicious client into a stable set of good quality DNS failure clusters, for each cluster a unique pattern is extracted in the pattern extraction module (316), and correlate it with suspicious, successful DNS resolutions. If a successful DNS session from the suspicious client is found to correlate with the pattern of a good quality DNS failure cluster, the server IP address of the successful DNS session is also assigned a suspicious status. In other words, if the successful DNS session is processed through the suspicious client detecting framework (310) and the clustering module (314) determines it should be added to the good quality DNS failure cluster, the server IP of the successful DNS session is identified as a suspicious server IP. In addition, if a failed DNS session of another client matches a pattern from a good quality DNS failure of the suspicious client, the another client can also be assigned a suspicious status even before sufficient DNS failures of the another client is processed by the suspicious client detecting framework (310) to assign the suspicious status.

In the example described below, the failed DNS queries (311) from the client machine are obtained from network traces collected at a vantage point within a large ISP. The monitored network covers several residential subnets as well as some commercial subnets. The example focuses primarily on the residential subnets, where most malicious activities are observed. The client machines on the residential subnets are assigned static IP addresses using private realm IP address blocks. The datasets includes two portions, each spanning 24 hours during August 2011 and April 2012, respectively. All incoming and outgoing TCP connections and UDP flows to the network were captured in these two days. From the captured network traces, all the DNS queries and responses are extracted to produce two 24-hour long DNS datasets. The relevant TCP/UDP flows are also used for investigating and verifying certain suspicious or malicious activities uncovered in the DNS datasets. To protect privacy, client IP addresses were anonymized and other sensitive information was stripped or sanitized before the network traces were used for analysis.

In the DNS datasets, DNS queries are matched with corresponding DNS responses using the ID field contained in both the queries and responses. The resulting query-response pair is referred to as a DNS session. All unmatched DNS queries or responses are discarded. This matching process produces 14 million DNS sessions for the Aug2011 dataset, and 27 million DNS sessions for the Apr2012 dataset. The example analysis focuses on the A:IN type of queries/responses (namely, a client queries for the IPv4 address using a DNS name of interest), all other types of DNS sessions are removed from further consideration. Table I summarizes some key statistics of the two datasets. As shown in TABLE I, DNS sessions are categorized into two categories: successful and failed queries or sessions. A DNS query is successful if the corresponding DNS response carries the response code, RCODE=0; otherwise, it is considered as a failed query (the corresponding DNS query/session is referred to as a DNS failure). In particular, 98.6% of DNS failures in the datasets carry the response code RCODE=3 (Name Error) or RCODE=2 (Server Failure). The example analysis focuses on these two types of the DNS failures. For the two datasets, the DNS failure rate is roughly 2.62% and 2.15%, respectively. A significant portion of the DNS failures are due to either (i) DNS overloading or (ii) queried DNS names not containing an effective top-level domain (eTLD) name. The latter can be attributed to a variety of reasons, e.g., user typos, "misuses" of DNS by certain applications or services, or mis-configurations. Most of these instances can be considered as "benign" failures and are filtered out without being considered in the example analysis.

TABLE I

OVERVIEW OF THE TWO DNS TRACES.

| Items | August 2011 | April 2012 |
|---|---|---|
| Total A:IN DNS sessions w/eTLDs | 12,816,150 | 24,039,008 |
| Failed DNS sessions | (2.62%) 335,588 | (2.15%) 516,047 |
| Queried names | 892,255 | 1,113,073 |
| Clients | 12,272 | 15,911 |

In the example analysis, the DNS traces of the clients machines (also referred to as clients) are categorized based on their suspicious failure patterns. The first category "random-looking domains" dominates a large number of total failures and is readily detectable, while the other categories have much fewer and stealthier failures. Each of the categories is described below.

A. Random-looking Domain Clusters (referred to in TABLE V as Cat-R). These clusters correspond to random DGA malwares such as Conficker, Torpig, Sality, Cutwail.BQ, Simda-E, etc. Table II shows a sample set of random-looking domain names generated by an infected client.

TABLE II

RANDOM DGA SAMPLES

| Conficker | Torpig |
|---|---|
| arjynor.net | bfejhvfe.com |
| bdjcueuagtq.ws | dihxfhci.com |
| clrkknzxm.cc | gwubvjue.com |
| dziebuzkt.net | hfbdgxdw.biz |
| ykoheps.net | vgwdcidw.com |
| zumxknrjcy.net | xxjgwbwd.com |
| ... | ... |

B. (Semi-) Random Looking Domain Name Failure Patterns with Limited Character Set (referred to in TABLE V as Cat-C). The eSLDs contained in the failed DNS queries of this cluster share some characteristics with the previous category, with a key difference that the character set (letters and numbers) come from a limited character set. Table III shows a sample set of semi-random looking domain names generated by three infected client (C.1, C.2 and C.3). The successful queries are marked by "s" in the parenthesis after the name.

TABLE III

SEMI-RANDOM LOOKING DNS NAMES WITH LIMITED CHARACTER SET (CATEGORY C): SAMPLES.

C.1

89s7dgf78get367gs6.com
89s7dgf87gsdggs.in
89s7dgfxvdf6gsdgf.com.ve
8shdf878sdfgs.cc
s7dfgs87gdfg8s7df.co.uk
s879dgths78df6sgdf.com
s87fggsdfuyvsdvtftds.ar
s78dgfyg87sdfs6dvf.int.nf (s)
s89d7fgh37rsh7f8.au
s89dfhshdf8hsdf.cw
s89fdhsbydf7hgsdf.asia
s8d7fgs78dgf87sgdf.cn
s8d9fghsdbyf7s86d6fg.pn
s8df7gyeg87rsf6gs.web.gg (s)
sd7fgh783r7sgdf.us
sd7fgs7gdfg78sgfd.com
sd9f08hsdfybs76dft.cc
sd9817ghsdfysdg6f.co.gp (s)
sdf7gsd78fs8d7fg.net
sdf9s87dfh78y6rg8we.cx.cc (s)
sdfg7sdfsdf67g.cu
stbnsuf67e5w5g6fsd.cn
w47rg7hubisdf7svdf.by
3r497w886frg87sudfg.co.cc (s)
w38r97ggsdhfbysdf7y.pro.vg (s)
9sd7fg87sgdfg7sfd.co.cc (s)

C.2

02e4f47239ec4228bdf59872697367ce.com
03620ed00bb041699ffa7f025e6043e8.com

TABLE III-continued

SEMI-RANDOM LOOKING DNS NAMES WITH LIMITED CHARACTER SET (CATEGORY C): SAMPLES.

...
11de14271e4c4d66beaecdac7de4295a.com
125eb96f17ec413db713726a3215503a.com
...
fdf298c0b6894524ba373f230ef843ba.com
ffe320d273ca4a969d26ce19e23chf49.com
C.3 a65255b65255.com
a65582b65582.com
a59061b59061.com
a59451b59451.com
a63492b63492.com
a66489b66489.com
a685951b685951.com
a686435b686435.com
a7098373b7098373.com
a8685371b8685371.com
a18834500b18834500.com
a19646531b19646531.com C. Mutated String Domain Name Failure Patterns (referred to in TABLE V as Cat-M). The third suspicious category groups together various subtly different patterns, in which eSLDs all "look similar" to each other, in the sense that they are either mutated from a common string, or transformed from one string to another by changing (e.g., inserting, deleting, or substituting) one or two characters at a time. Table IV presents two representative examples that belong to this category.

TABLE IV

TWO SAMPLES OF MUTATED PATTERNS.

| M.1 | M.2 |
|---|---|
| google.xx (benign) | servizi.mediaset.xx (benign) |
| oogle.xx (s) | sportmediaset.mediase.xx (s) |
| gogle.xx (benign) | sportmediaset.medias.xx |
| goole.xx (s) | sportmediaset.media.xx |
| googl.xx (s) | sportmediaset.medi.xx |
| ggoogle.xx (s) | sportmediaset.med.xx |
| gogole.xx (s) | sportmediaset.me.xx |
| goolge.xx (s) | sportmediaset.m.xx |
| googel.xx | sportmediaset.xx (benign) |
| giogle.xx | sportmediase.xx (s) |
| foogle.xx (s) | sportmedias.xx |
| gOogle.xx (s) | sportmedia.xx (s) |
| gpogle.xx | sportmedi.xx (s) |
| gkogle.xx | sportmed.xx (s) |
| go9gle.xx | sportme.xx (s) |
| golgle.xx | sportm.xx |
| gokgle.xx | sport.xx (benign) |
| gootle.xx (s) | spor.xx (s) |
| gooble.xx (s) | spo.xx (s) |
| gooigle.xx | sp.xx |
| goo9gle.xx (s) | s.xx |
| goo0gle.xx | sportmediaset.mediaset.xx (benign) |

In the case of the example M.1 in Table IV, a burst of more than 100 queries for DNS names are mutations of the string "google", including legitimate queries, such as to google.xx and gogle.xx that are resolved to benign IPs owned by Google, Inc. Besides these "legitimate" queries, a significant portion of these queries are also successful. However, the returned IP addresses belong to a variety of ISPs (not to Google, Inc). Many of these IP addresses have been confirmed to be malicious (e.g., blacklisted). These queries were issued in a short time span of a minute or two.

In the case of the example M.2 in Table IV, the suspicious behavior started with a query and ended with another query for two different legitimate websites, whose DNS names share some portions with the suspicious queries that came in between. The suspicious queries were issued in a short period of time of less than a minute. The suspicious query starts with a two-part string separated by ".". That is mutated from a legitimate website, gradually evolving to a shorter string by deleting one character at a time.

D. Substring Domain Name Failure Pattern (referred to in TABLE V as Cat-S). This category concerns eSLDs that exhibit a common substring pattern. Table V shows some examples in the following two subcategories: (i) Fixed prefix with varying letters (S.1) and (ii) Fixed prefix with varying digits (S.2). The failure patterns in this category are in general least noisu and in a sense most stealthy. All the examples from Table V have been labeled as Troj/Agent-VUD and Troj/DwnLdr-JVY.

TABLE IV

SUBSTRING DNS NAMES (CATEGORY S): SAMPLES.

| S.1 | S.2 |
|---|---|
| searchodd.org | lonelyday01.in (s) |
| searchbite.org | lonelyday03.in (s) |
| searchangle.org | lonelyday04.in |
| searchbrick.org | lonelyday05.in |
| searchlousy.org | lonelyday06.in |
| searchcommon.org | ginsburg02.in (s) |
| searchhissing.org | ginsburg03.in |
| findcap.org | ginsburg04.in (s) |
| findthousand.org | 1111fertionk016.be |
| findexpensive.org | 1111fertionk017.be |
| findsquealing.org | domain470001.com |
| findtherefore.org | domain480002.com |
| clickbrake.org | ... |
| clickafraid.org | domain530005.com |
| ... | domain490002.com (s) |

TABLE VI summarizes the categories found from a systematic analysis and detailed manual inspection of the two datasets. TABLE VI lists the number of clients that exhibited any of the detected malicious DNS behaviors and a breakdown of the number of clients that generated patterns from the four major categories described above. TABLE V shows the statistics for the malicious clusters identified.

TABLE V

STATISTICS OF MANUALLY INVESTIGATED CLIENTS AND CLUSTERS.

| | August 2011 dataset | | April 2012 dataset | |
|---|---|---|---|---|
| | Clients | Clusters | Clients | Clusters |
| All labeled | 104 | 116 | 99 | 127 |
| Cat-R/Rand | 50 | 50 | 50 | 50 |
| Cat-C/Jacc | 5 | 5 | 5 | 5 |
| Cat-M/Edit | 17 | 17 | 8 | 9 |
| Cat-S/Subs | 35 | 44 | 55 | 63 |

FIG. 3.2 depicts different clustering tasks employed by the example suspicious client detecting framework (310) shown in FIG. 3.1 above. In particular, these tasks include the augmentation (321), creation (322), evaluation (323), consolidation (324), and deprecation (325). In particular, these clustering tasks are performed according to two separate repetition time intervals $\Delta t$ and $\Delta T$ along the time scale (320). In the example shown in FIG. 3.2, the augmentation (321) is performed once for each repetition time interval $\Delta t$, while each of the creation (322), evaluation (323), consolidation (324), and deprecation (325) is performed once for each repetition time interval ΔT. These repetition time intervals are adjusted to obtain accurate and stable failure clusters, as well as to enable the applicability of achieving near real-time detection. In creation (322), new clusters are created out of unclustered eSLDs, denoted as $\{r_i\}$, using each of the clustering algorithms independently. Since selecting the "right" algorithm at the clustering stage is challenging; all algorithms are run in parallel, and rely on the evaluation (323) to clean up poor-quality clusters. Creation (322) operates periodically on the ΔT interval (e.g., one hour). Augmentation (321) operates in every Δt interval (e.g., 5 min), in which existing clusters, denoted as $\{C_i\}$, are augmented with new eSLDs, denoted as $\{s_i\}$, that arrive in this interval. The existing clusters and unclustered eSLDs after such creation and augmentation tasks are denoted as $\{C_i'\}$ and $\{r_i'\}$, respectively. Different clustering algorithms have different rules on how to perform such incremental update. Note that for clusters detected by the same algorithm, a particular eSLD may be added to at most one of them; but this eSLD is allowed to be added to multiple clusters detected by different clustering algorithms. eSLDs that fail to be added to any existing clusters are put into the unclustered eSLDs $\{r_i\}$ for the next round of cluster creation by creation (322). At may be adjusted down to a small-enough value to achieve near-real-time updating.

In order to keep the "right" or "good" clusters, and clean up "poor-quality" ones, the quality of a cluster is evaluated in evaluation (323). Such quality evaluation is useful in consolidating or deprecating a cluster. As described above, the following four properties are the dominant factors that affect the "quality" of a cluster:

(1) The cluster cohesiveness, denoted as $c_i$. It measures how similar the failed eSLDs in this cluster are to each other. The $c_i$ is calculated in different ways for clusters detected by different clustering algorithms. The $c_i$ may be normalized to within [0,1], with 1 being most cohesive.

(2) The number of failed eSLDs in the cluster, denoted as $z_i$. Suspicious activities that abuse DNS often exhibit DNS failures with a large number of distinct eSLDs. Therefore, a cluster with larger $z_i$ is assigned a higher score.

(3) The number of "instances", denoted as $n_i$. Many cases are found in the example DNS datasets where "almost" the same set of eSLDs fail repeatedly in multiple time epochs—such an epoch is referred to as an "instance" for the set of eSLDs. An eSLD cluster with more of such instances is assigned a higher score. Here "almost the same set" is empirically defined as at least 80% set overlap.

(4) The average length of time intervals of adjacent queried names, denoted as $g_i$. It is found in the example DNS datasets that correlated suspicious failures are likely to happen in a burst (e.g., a chain of HTTP redirections may happen, and cause a series of correlated DNS queries—many of which may fail—in very short period of time). A cluster that contains failed queries with shorter inter-arrival time is assigned a higher score. Note that if the cluster has multiple instances, this average interval is computed for each instance separately, and then averaged to generate the average length of time intervals. For example, if a cluster contains DNS failures that happen in three bursts of instances, each having very short intervals, the $g_i$ is small even if the three instances are far away in time from each other.

In summary, a cluster with higher "cohesiveness" ($c_i$), larger size ($z_i$), more persistent repetitions (i.e., large $n_i$), and closer co-occurrence (i.e., small $g_i$) is assigned a higher score. As an example, the score, denoted as $Q_i=f_d(c_i; g_i; z_i; n_i)$ where d represent a particular clustering algorithm, increases with $c_i$, $z_i$, and $n_i$, and decreases with $g_i$. Note that different clustering algorithms d may have different forms of the evaluation function $f_d$. As a simplified example, the following formula may be used for all clustering algorithms:

$$Q_i = c_i \cdot e^{-g_i/10} \cdot [1+e^{-(z_i/100+n_i)}]^{-1}$$

Further as shown in FIG. 3.2, the evaluation (323) also operates in the same ΔT interval, right after the creation (322) is performed. Following the evaluation (323), the consolidation (324) and the deprecation (325) are performed, both of which use the score generated by the evaluation (323). In the consolidation (324), two clusters of the same type are combined into a single cluster if the resulting combined cluster has a higher score than both existing clusters. Such consolidation starts with the two clusters having the smallest sizes, and proceeds recursively until no more consolidations are possible. The deprecation (325) follows the consolidation (324), and performs the following three deprecation routines:

(a) Time-fading deprecation: Right after each round of creation (322), the deprecation (325) is performed to re-examine existing clusters $\{C_i'\}$ and clean up any "poor-quality" cluster. A "fading" effect is added to the $Q_i$ evaluation score to penalize clusters not consistently appearing over time. Formally, let t be the time (unit: second along the time scale (320)) when the current round of deprecation (325) is being performed, $t_0$ be the latest occurrence time (along the time scale (320)) of any eSLD in the cluster. A cluster is deprecated (i.e., deleted) if it satisfies $e^{-\gamma(t-t_0)} \cdot Q_i < 0.1$, where γ is a fading factor, such as 1/5000 as a good empirical value. After the deletion, all eSLDs in the deleted cluster are put back to the pool of unclustered eSLDs $\{r_i'\}$, awaiting the next round of creation (322).

(b) Deprecation avoidance: To avoid accidental deletions of good clusters (in particular, those with high cohesiveness) that only show up a few times or do not span across the entire time frame, a "non-deletable" label is assigned to those clusters with $Q_i$ larger than a pre-determined threshold (e.g., 0.95) to override the time-fading effect in the previous routine.

(c) Deprecating clusters of different types: Clusters generated by different clustering algorithms are compared to make a joint deprecation decision: Given a larger cluster $C_1$ detected by algorithm A, and a smaller cluster $C_2$ detected by algorithm B, C2 is deprecated if it passes both an overlap test |C1∩C2|/|C2|>a (e.g., a=0.9) and a score test $Q_1 > b \cdot Q_2$ (e.g., b=2). Such deprecation decision is effective for cleaning "poor-quality" and redundant clusters generated by different clustering algorithms.

Additional details of the augmentation (321), creation (322), evaluation (323), consolidation (324), and deprecation (325) are described below for each of the example clustering algorithms described above.

For the randomness measure based clustering algorithm, the randomness of an eSLD may be determined based on the distribution of the characters in the character string of the eSLD. For example, the likelihood of an eSLD coming from the empirical character distribution of all benign eSLDs in a dataset is compared against the likelihood of the eSLD coming from a hypothetical uniform or random character distribution. The difference of these two likelihoods is computed and normalized using the standard logistic function to a randomness score bounded in [0, 1]. If such randomness score is larger than an empirical threshold (e.g., 0.09), the character string of the eSLD is considered as "random". In another example, other randomness measure known to those skilled in the art may also be used to identify random eSLDs based on a suitable threshold. All random eSLDs are added into a single cluster based on the assumption that such random names are sufficient to raise an alarm at the early stage of the detection or defense for malicious activities. In creation (322) and augmentation (321), the randomness test is performed on each of the incoming eSLDs, and on a per-string basis, without any pair-wise computation. Since one single cluster is maintained, consolidation (324) is not performed. The cohesiveness $c_i$ of this random cluster is computed by linearly scaling the average randomness score "r" of all members using (r+3)/4, i.e., scaling the range [0.09, 1] to [0.77, 1]. Since the transformations are all linear, and $c_i$ computes the arithmetic mean, $c_i$ can be updated incrementally.

For the Jaccard distance based clustering algorithm, the Jaccard distance on two character sets A and B is defined as 1−|A∩B|/|A∪B|, measuring the dissimilarity of the character sets used by two strings. The Jaccard distance is used as the metric to cluster strings with similar character set. Creation (322) includes (i) computing pair-wise Jaccard distances on a set of eSLDs $\{s_i\}$, and represent the Jaccard distances of $s_i$ to other strings as a vector $v_i$, (ii) computing a threshold $c_i$ from [0.2, 0.3] based on $v_i$, using a natural cutoff algorithm, (iii) for every string $s_i$, merge it with any other string to which its Jaccard distance is less than $c_i$. Note: (a) when merging two strings, the two clusters that the two strings belong to are merged—this applies to the edit distance based detection and the substring detection as well, (b) when new strings are added, or computed against an existing cluster, only the new Jaccard distances between new strings and strings in the existing cluster are computed. The cohesiveness $c_i$ is computed as one minus the average pair-wise Jaccard distance. It can be incrementally updated as well.

For the Edit distance based clustering algorithm, Levenshtein Edit distance is used as a standard metric for measuring the dissimilarity of two strings. It calculates the minimum number of single-character edits (i.e., insertion, deletion, substitution) required to transform one string to the other. The cohesiveness property $c_i$ of a cluster produced by the Edit distance clustering algorithm is computed as one minus the average pair-wise normalized Edit distance over all pairs. The update mechanism of $c_i$ is the same as the Jaccard distance based clustering algorithm.

For the substring test based clustering algorithm, the goal is to cluster strings with common substrings. Each cluster has only one substring to represent the pattern of this cluster. The cohesiveness $c_i$ is set to 1 for this type of cluster. Creation (322) includes: (i) obtaining pair-wise matched substrings for all pairs of strings (note: the matching blocks are by-products of the Levenshtein edit distance computation, so re-computing substrings is avoided), (ii) recording the frequency count of each matching substring if the substring is at least of length 4 and does not end with a suffix such as "-tion", "-ing" and "-able", (iii) sorting the frequency counts in descending order, normalize them into a sequence each bounded in [0; 1], and use the natural cutoff algorithm to decide on a cutoff, and (iv) for each matching substring beyond the cutoff, merge all strings with such matching substring into a cluster.

Figure 4:
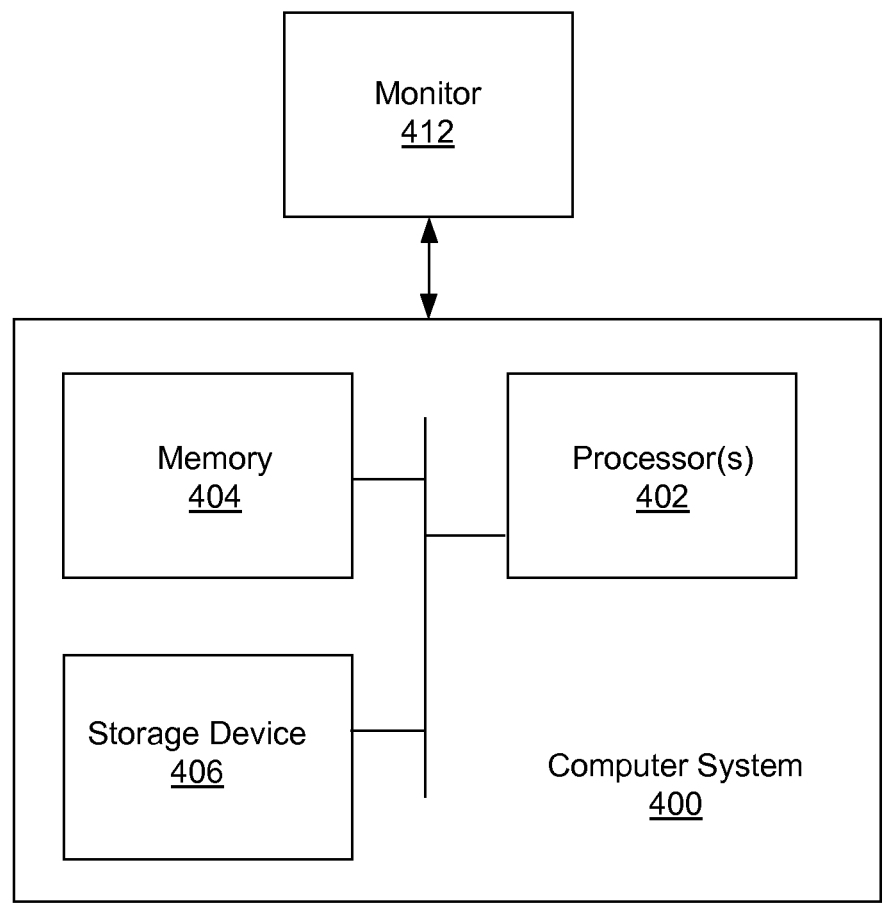
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (not shown), a mouse (not shown), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network (not shown). Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a malicious node in a network, comprising:

obtaining a plurality of failed domain name service (DNS) queries from the network, wherein each of the plurality of failed DNS queries is initiated from a client node of the network and comprises an effective second-level domain (eSLD) name;

generating, by a computer processor device and using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm;

determining, by the computer processor and using a pre-determined formula, a score representing statistical characteristics of the cluster, wherein statistical characteristics include a cohesive measure, a size measure, and a repetitiveness measure, the cohesive measure representing similarity among the portion of the plurality of eSLD names included in the cluster, the size measure representing a tally of the eSLD names included in the cluster, and the repetitiveness measure representing a number of similar subsets of the cluster repetitively occurring at different time epochs; and assigning, in response to the score meeting a pre-determined criterion, a malicious status to the client node.

2. The method of claim 1, further comprising:
using the cohesiveness measure as an input of the pre-determined formula to determine the score,
wherein the score is proportional to the cohesiveness measure.

3. The method of claim 1, further comprising:
using the size measure as an input of the pre-determined formula to determine the score,
wherein the score is proportional to the size measure.

4. The method of claim 1, further comprising:
using the repetitiveness measure as an input of the pre-determined formula to determine the score,
wherein the score is proportional to the repetitiveness measure.

5. The method of claim 1, further comprising:
calculating an inter-arrival time measure of the cluster to represent an average inter-arrival time of the eSLD name in the portion; and
using the inter-arrival time measure as an input of the pre-determined formula to determine the score,
wherein the score is inversely proportional to the inter-arrival time measure.

6. The method of claim 1,
wherein the pre-determined clustering algorithm is based on at least one selected from a group consisting of a randomness measure, a Jaccard distance, an edit distance, and a substring test associated with the eSLD name in each of the plurality of failed DNS queries.

7. The method of claim 1, further comprising:
obtaining a successful DNS query from the network, wherein the successful DNS query is initiated from the client node and comprises another eSLD name;
comparing the another eSLD name to the cluster to determine a match; and
assigning, in response to the match, the malicious status to a server node identified based on a server IP address returned by the successful DNS query.

8. The method of claim 1, further comprising:
extracting an eSLD name pattern from the portion of the plurality of eSLD names;
obtaining another failed DNS query from the network, wherein the another failed DNS query is initiated from another client node and comprises another eSLD name;
comparing the another eSLD name to the eSLD name pattern to determine a match; and
assigning, in response to the match, the malicious status to the another client node.

9. A system for detecting a malicious node in a network, comprising:
a processor device; and
memory storing instructions executable by the processor, wherein the instructions comprises:
a cluster generation module configured to:
obtain a plurality of failed domain name service (DNS) queries from the network, wherein each of the plurality of failed DNS queries is initiated from a client node of the network and comprises an effective second-level domain (eSLD) name; and
generate, using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm;
a cluster evaluation module configured to:
determine, using a pre-determined formula, a score representing statistical characteristics of the cluster, wherein statistical characteristics include a cohesive measure, a size measure, and a repetitiveness measure, the cohesive measure representing similarity among the portion of the plurality of eSLD names included in the cluster, the size measure representing a tally of the eSLD names included in the cluster, and the repetitiveness measure representing a number of similar subsets of the cluster repetitively occurring at different time epochs; and
a malicious status assigning module configured to:
assign, in response to the score meeting a pre-determined criterion, a malicious status to the client node; and
a repository configured to store the plurality of eSLD names and the cluster.

10. The system of claim 9, the cluster evaluation module further configured to:
use the cohesiveness measure as an input of the pre-determined formula to determine the score,
wherein the score is proportional to the cohesiveness measure.

11. The system of claim 9, the cluster evaluation module further configured to:
use the size measure as an input of the pre-determined formula to determine the score,
wherein the score is proportional to the size measure.

12. The system of claim 9, the cluster evaluation module further configured to:
use the repetitiveness measure as an input of the pre-determined formula to determine the score,
wherein the score is proportional to the repetitiveness measure.

13. The system of claim 9, the cluster evaluation module further configured to:
calculate an inter-arrival time measure of the cluster to represent an average inter-arrival time of the eSLD name in the portion; and
use the inter-arrival time measure as an input of the pre-determined formula to determine the score,
wherein the score is inversely proportional to the inter-arrival time measure.

14. The system of claim 9,
wherein the pre-determined clustering algorithm is based on at least one selected from a group consisting of a randomness measure, a Jaccard distance, an edit distance, and a substring test associated with the eSLD name in each of the plurality of failed DNS queries.

15. The system of claim 9, the malicious status assigning module further configured to:
obtain a successful DNS query from the network, wherein the successful DNS query is initiated from the client node and comprises another eSLD name;
compare the another eSLD name to the cluster to determine a match; and
assign, in response to the match, the malicious status to a server node identified based on a server IP address returned by the successful DNS query.

16. The system of claim 9, the malicious status assigning module further configured to:
extract an eSLD name pattern from the portion of the plurality of eSLD names;

obtain another failed DNS query from the network, wherein the another failed DNS query is initiated from another client node and comprises another eSLD name;

compare the another eSLD name to the eSLD name pattern to determine a match; and assign, in response to the match, the malicious status to the another client node.

17. A non-transitory computer readable medium embodying instructions for detecting a malicious node in a network, the instructions when executed by a processor device comprising functionality for:

obtaining a plurality of failed domain name service (DNS) queries from the network, wherein each of the plurality of failed DNS queries is initiated from a client node of the network and comprises an effective second-level domain (eSLD) name;

generating, using a pre-determined clustering algorithm, a cluster from a plurality of eSLD names comprising the eSLD name of each of the plurality of failed DNS queries, wherein the cluster comprises a portion of the plurality of eSLD names that is selected based on the pre-determined clustering algorithm;

determining, using a pre-determined formula, a score representing statistical characteristics of the cluster, wherein statistical characteristics include a cohesive measure, a size measure, and a repetitiveness measure, the cohesive measure representing similarity among the portion of the plurality of eSLD names included in the cluster, the size measure representing a tally of the eSLD names included in the cluster, and the repetitiveness measure representing a number of similar subsets of the cluster repetitively occurring at different time epochs; and assigning, in response to the score meeting a pre-determined criterion, a malicious status to the client node.

18. The non-transitory computer readable medium of claim 17, the instructions when executed by the processor further comprising functionality for:

using the cohesiveness measure as an input of the pre-determined formula to determine the score, wherein the score is proportional to the cohesiveness measure.

19. The non-transitory computer readable medium of claim 17, the instructions when executed by the processor further comprising functionality for:

using the size measure as an input of the pre-determined formula to determine the score, wherein the score is proportional to the size measure.

20. The non-transitory computer readable medium of claim 17, the instructions when executed by the processor further comprising functionality for:

using the repetitiveness measure as an input of the pre-determined formula to determine the score, wherein the score is proportional to the repetitiveness measure.

21. The non-transitory computer readable medium of claim 17, the instructions when executed by the processor further comprising functionality for:

calculating an inter-arrival time measure of the cluster to represent an average inter-arrival time of the eSLD name in the portion; and using the inter-arrival time measure as an input of the pre-determined formula to determine the score, wherein the score is inversely proportional to the inter-arrival time measure.

22. The non-transitory computer readable medium of claim 17, wherein the pre-determined clustering algorithm is based on at least one selected from a group consisting of a randomness measure, a Jaccard distance, an edit distance, and a substring test associated with the eSLD name in each of the plurality of failed DNS queries.

23. The non-transitory computer readable medium of claim 17, the instructions when executed by the processor further comprising functionality for:

obtaining a successful DNS query from the network, wherein the successful DNS query is initiated from the client node and comprises another eSLD name;

comparing the another eSLD name to the cluster to determine a match; and assigning, in response to the match, the malicious status to a server node identified based on a server IP address returned by the successful DNS query.

24. The non-transitory computer readable medium of claim 17, the instructions when executed by the processor further comprising functionality for:

extracting an eSLD name pattern from the portion of the plurality of eSLD names;

obtaining another failed DNS query from the network, wherein the another failed DNS query is initiated from another client node and comprises another eSLD name;

comparing the another eSLD name to the eSLD name pattern to determine a match; and assigning, in response to the match, the malicious status to the another client node.

* * * * *